3,223,561
SOLDERING FLUX
Hobart N. Durham, Jr., Pena Blanca, N. Mex., assignor, by direct and mesne assignments, to Connecticut Valley Chemical, Inc., Essex, Conn., a corporation of Connecticut
No Drawing. Filed Jan. 19, 1962, Ser. No. 167,418
3 Claims. (Cl. 148—23)

This application is a continuation-in-part of my application Serial No. 154,358, filed November 22, 1961, now abandoned, for "Soldering Flux."

The present invention relates to novel and improved compositions for use as soldering fluxes, especially fluxes for use with soft solders, such as conventional tin-lead solders for the soldering of copper and copper alloy parts, as well as parts made of other metals.

The present invention has for its object the provision of a novel and improved flux which is highly active and rapidly cleans the surface of copper and copper alloy parts or zinc coated parts to be soldered, and which leaves none or almost no corrosive residue on the parts after the soldering operation has been completed. A further object is the provision of an improved fluxing composition which eliminates excessive splattering of the flux, so that removal of excess flux on adjacent parts is normally avoided while such splattered excess flux as may splatter on adjacent unheated parts is easily, quickly and thoroughly removed by a simple rinse in clean water. Still another object is the provision of a solder flux which has at most only a slight tendency to react with the unoxidized surface of the metal to which it is applied. The flux compositions of the present invention provide compositions which are completely decomposed or vaporized at about or somewhat below soldering temperatures so that excess flux compositions is automatically removed during the soldering operation.

The flux compositions of the present invention are further distinguished from those of the prior art in that no compounds are included which are capable of carbonizing under soldering conditions, and once the soldering operation has been completed there remains neither any corrosive residues, nor any carbonaceous residues, nor any other foregin residues which might interfere with the desirable low resistance characteristics of the solder joints, nor with the contact resistance of adjacent contacts. Likewise, the automatic complete removal of the soldering flux avoids current leakage paths between adjacent terminals.

Solder joints made using a flux of the present invention are substantially the equal of those made using zinc chloride or rosin, but avoid all of the many disadvantages which are inherent in the use of either zinc chloride or rosin as a flux. Also avoided are the many disadvantages of the other fluxes which, when used for the soldering of joints in printed circuits, require that the parts be subsequently cleaned by elaborate procedures which often require washing with volatile organic solvents followed by ultrasonic treatment while immersed in water. Thus, as contrasted with the use of the solder fluxes of the prior art, great economies may be effected by the use of the solder fluxes of the present invention in the soldering of minute parts, such as those found in printed circuits and miniaturized components.

In general, the compositions of the present invention comprise a water solution of hydrazine acetate with a substantial excess of the free acetic acid. Preferably, water alone is used as the solvent and carrier, but if any other solvent or substance is added to the solution it should be a compound which is substantially completely decomposed or vaporized when subjected to temperatures approximating the soldering temperature and without the formation of corrosive or contaminating substances or soot. That is, the compositions of the present invention consist of a mixture of hydrazine acetate and acetic acid in various proportions and in suitable concentrations, such solutions always including the acid in substantial excess, and including no other substances which form deleterious contaminants, such as corrosive material or soot. As used herein the term, hydrazine acetate means a mixture formed by mixing one mole of hydrazine with two moles of acetic acid, sometimes represented by the formula:

$$N_2H_4 \cdot 2CH_3COOH$$

While a considerable excess of the acetic acid is preferred, good soldering fluxes for soft soldering may be constituted as a water solution of hydrazine acetate, with a minimum of about one-quarter or one-half mole of excess acid for each mole of hydrazine salt; that is, for each mole of hydrazine there should be included a minimum of about two and one-quarter or one-half moles of acetic acid. Such a mixture may be diluted with water even to the extent that the concentration of hydrazine acetate is of the order of 1 mole per liter.

According to the present invention, the soldering fluxes comprise an excess of free acetic acid, which excess should not be sufficient to cause appreciable corrosion of the metal parts during the period between the application of the flux and the soldering operation. Thus, the excess acetic acid should be limited to a maximum so that the total combined and free acetic acid is no more than about 4½ times the molar concentration of hydrazine.

The concentration of the solution may vary widely for effective fluxing. The solution should contain from about 1 to 4 moles of hydrazine acetate per liter with the required excess of free acetic acid. Optimum results are achieved when the hydrazine acetate is present in solution at a concentration of about 2 moles per liter with and excess of acetic acid of about 1 mole per liter.

The foregoing general description and the following detailed description are exemplary and explanatory of the invention but are not restrictive thereof.

The following specific examples are illustrative of various solder fluxing compositions according to the present invention.

*Example 1*

The preferred fluxing composition of the present invention comprises a water solution consisting of:

Grams
Hydrazine hydrate _____ 100
Acetic acid (100%) _____ 360
Water, sufficient to make 1 liter.

Such a solution is conveniently prepared by diluting 68 grams of "anhydrous" hydrazine (95%) with about 200 to 300 ml. of water, after which 360 grams of acetic acid are added with stirring and cooling to the diluted hydrazine hydrate. The hydrazine acetate-acetic acid mixture thus obtained is then diluted to about 1 liter, and is ready for use.

Such a fluxing solution applied to the metal parts to be soldered prior to heating loosens any scale on the metal, reducing cupric oxide to cuprous oxide, and when heated to soldering temperature causes good flow of solder to form an excellent bond. After cooling, it is found that any excess flux has been decomposed or vaporized, leaving the metal surfaces clean. If sputtering of the flux has resulted in some of the excess flux being deposited on adjacent cooler portions of the metal, this excess can be easily removed by simple rinsing with water. Corrosion of the metal parts is noticeably absent, and the bond obtained between copper or copper alloy parts, using 50/50 or 60/40 tin-lead solder is the equivalent of the bond obtained with corrosive fluxes such as zinc chloride or with rosin, both of which require subsequent elaborate cleaning for exacting work.

Similar results are obtained by using the fluxing solution of Example 1 in more dilute form and the solution of the above formula may be diluted with as much as an equal part of water without greatly impairing the desirable results which may be achieved by its use. Likewise, the formula of Example 1 may be made up in more concentrated form up to the limit of solubility of the hydrazine acetate in the solution. However, it is preferred to use concentrations varying from about 50 grams to about 225 grams of hydrazine hydrate per liter of solution, the ratio of hydrazine hydrate to acetic acid being kept within the limits set forth above.

*Example 2*

A water solution consisting of hydrazine acetate with a one-quarter or one-half molar excess of acetic acid prepares copper and copper alloy surfaces for soldering with lead-tin solders under normal soldering conditions. Such solutions, used in a concentration of from 15% to 60% hydrazine acetate in water containing the one-quarter or one-half molar excess of acetic acid result in moderately good bonds, with moderately good solder flow on the copper parts, under carefully controlled conditions which provide against excessive heating of the copper parts.

Contrasted with the results obtained with even one-quarter or one-half mole excess acetic acid for each mole of hydrazine acetate in water solution, the use of hydrazine hydrate or acetate in water solution does not give an effective bond in soldering and does not cause a good flow of the solder, although hydrazine hydrate reduces any surface cupric oxide to cuprous oxide moderately well, loosens surface scale from the metal and thus presents a relatively clean surface. However, this clean surface appears to oxidize when heated to soldering temperatures, and when such temperatures are attained, difficulty is encountered in wetting the surface with the solder.

*Example 3*

A composition containing more excess acetic acid than is present in Example 1 or Example 2, may be prepared by mixing 90 grams or 1½ mole or acetic acid and 152 grams or 1 mole of hydrazine acetate with water to form one liter of solution. Otherwise stated, this solution may be prepared from 1 mole of hydrazine and 3½ moles of acetic acid for each liter of water solution. This produces a fluxing solution which improves the flow of the molten solder on the metal parts and results in a better bond than is obtained by the fluxing solution of Example 2, but cleans faster and more effectively but without producing as good a flow of solder as the solution of Example 1.

*Example 4*

Substantial increase in the amount of acetic acid over that provided for by the composition of Example 3, leads to a fluxing solution which has undesirable corrosive properties on copper and copper alloys, and these effects begin to become objectionable when the *excess* acetic acid is about or more than 2½ moles per mole of hydrazine, that is 4½ or more times the molar concentration of the hydrazine. It is, therefore, important that the molar concentration of the excess acetic acid should not exceed 5 times the molar concentration of the hydrazine hydrate in the water solution. When more than 4½ moles of acetic acid are employed for each mole of hydrazine hydrate corrosion takes place rapidly on copper, with a rapid deterioration in the cleaning and fluxing activity of the solution.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. A composition for use as a soldering flux comprising a water solution consisting essentially of at least 1 mole per liter of hydrazine acetate, and an excess of acetic acid, the combined and free acetic acid being present in a molar quantity of from 2¼ to 4½ times that of the hydrazine.

2. A composition as claimed in claim 1 in which the concentration of the total acetic acid is from 3 to 4 moles per mole of hydrazine.

3. A composition as claimed in claim 1 in which the concentration of the total acetic acid is about 3½ moles per mole of hydrazine.

References Cited by the Examiner

UNITED STATES PATENTS

| | | | |
|---|---|---|---|
| 2,612,459 | 9/1952 | Willard et al. | 148—23 |
| 2,756,497 | 7/1956 | Gale | 148—23 |
| 2,868,833 | 1/1959 | Szabo et al. | 260—561 |
| 2,890,141 | 6/1959 | MacCormack | 148—23 |
| 3,099,590 | 7/1963 | Laudenslager | 148—23 |

DAVID L. RECK, *Primary Examiner.*

WINSTON A. DOUGLAS, *Examiner.*